United States Patent
Song et al.

(10) Patent No.: US 11,859,744 B2
(45) Date of Patent: Jan. 2, 2024

(54) AUTOMATIC CHEMICAL SUPPLY APPARATUS HAVING OPENING SHUTTER UNIT

(71) Applicant: STI CO., LTD., Anseong-si (KR)

(72) Inventors: Yong Ik Song, Seongnam-si (KR); Jun Woo Lee, Suwon-si (KR); Jin Woo Lee, Pyeongtaek-si (KR)

(73) Assignee: STI CO., LTD., Anseong-si (KR)

( * ) Notice: Subject to any disclaimer, the term of this patent is extended or adjusted under 35 U.S.C. 154(b) by 267 days.

(21) Appl. No.: 17/528,779

(22) Filed: Nov. 17, 2021

(65) Prior Publication Data

US 2023/0033970 A1   Feb. 2, 2023

(30) Foreign Application Priority Data

Aug. 2, 2021 (KR) .................. 10-2021-0101198

(51) Int. Cl.
| | |
|---|---|
| *F16L 33/22* | (2006.01) |
| *F16L 3/01* | (2006.01) |
| *E06B 7/28* | (2006.01) |
| *B01J 4/00* | (2006.01) |
| *E06B 3/38* | (2006.01) |

(52) U.S. Cl.
CPC .............. *F16L 33/22* (2013.01); *E06B 3/38* (2013.01); *E06B 7/28* (2013.01); *F16L 3/01* (2013.01); *B01J 4/001* (2013.01)

(58) Field of Classification Search
CPC .... F16L 33/22; F16L 3/01; E06B 3/38; E06B 7/28
See application file for complete search history.

(56) References Cited

U.S. PATENT DOCUMENTS

| | | | | |
|---|---|---|---|---|
| 9,498,662 | B2* | 11/2016 | Doten | A62C 5/008 |
| 11,019,922 | B1* | 6/2021 | Allen | A47B 61/00 |
| 2014/0261824 | A1* | 9/2014 | Byers | B24B 57/02 |
| | | | | 137/896 |
| 2018/0256835 | A1* | 9/2018 | Fornarelli | A24F 40/60 |
| 2021/0029967 | A1* | 2/2021 | Fussell, Jr. | A01K 3/006 |
| 2021/0308639 | A1* | 10/2021 | Pierce | B01F 35/60 |
| 2022/0055578 | A1* | 2/2022 | Fairbanks | B60S 3/002 |
| 2023/0033970 | A1* | 2/2023 | Song | B67D 7/0288 |
| 2023/0048862 | A1* | 2/2023 | Tsai | A61L 2/16 |
| 2023/0092534 | A1* | 3/2023 | Cowan | B65H 75/362 |
| | | | | 222/74 |
| 2023/0133451 | A1* | 5/2023 | Belanger | B60S 3/002 |
| | | | | 134/123 |

FOREIGN PATENT DOCUMENTS

KR    10-1572537    11/2015

* cited by examiner

*Primary Examiner* — Kevin R Barss
(74) *Attorney, Agent, or Firm* — KILE PARK REED & HOUTTEMAN PLLC

(57) ABSTRACT

The present disclosure relates to an automatic chemical supply apparatus having an opening shutter unit, the automatic chemical supply apparatus including a blocking door which consists of an opening/closing door and a blocking unit that are installed on a frame and which is configured to block an interior of the automatic chemical supply apparatus from the outside in a state in which a hose is seated on a mounting portion, a hose opening through which the hose passes in a state in which the opening/closing door is closed, and an opening shutter unit which is disposed on the blocking door and configured to open and close the hose opening.

11 Claims, 7 Drawing Sheets

AUTOMATIC CHEMICAL SUPPLY APPARATUS HAVING OPENING SHUTTER UNIT

CROSS-REFERENCE TO RELATED APPLICATION

This application claims priority to and the benefit of Korean Patent Application No. 10-2021-0101198, filed on Aug. 2, 2021, the disclosure of which is incorporated herein by reference in its entirety.

BACKGROUND

1. Field of the Invention

The present document relates to an automatic chemical supply apparatus, and more particularly, to an automatic chemical supply apparatus having an opening shutter unit that opens and closes a hose opening.

2. Discussion of Related Art

Generally, all companies that use hazardous chemicals, such as pharmaceutical companies, paint companies, and companies that manufacture semiconductors, semiconductor devices, liquid crystal displays (LCDs), and organic light emitting diodes (OLEDs), use various types of chemicals, and methods of safely supplying the chemicals have also been diversified.

Transfer of chemicals is performed by a method in which the chemicals are transferred from a chemical tank of a tank lorry stopped outside a building to a chemical storage tank installed inside the building and then are transferred from the chemical storage tank to a chamber where a unit process is performed. Conversely, chemicals are transferred from the chemical storage tank to the tank lorry in some cases.

An automatic chemical supply apparatus referred to as an automatic clean quick coupler unit (ACQC unit) has been released and is currently in use. Here, a chemical storage tank is mostly disposed inside a building, and the ACQC unit serves to supply chemicals between a chemical tank of a tank lorry outside the building and the chemical storage tank inside the building. Specifically, the ACQC unit is configured to include a chemical male connector mounting portion and a chemical female connector and may allow the chemical male connector mounting portion to move to the chemical female connector by a transfer means and allow a chemical male connector to be inserted into the female connector and fastened thereto or separated from the female connector automatically. Thus, chemicals may be safely supplied without workers being exposed to the chemicals.

A blocking door that constitutes the automatic chemical supply apparatus serves to prevent infiltration of foreign matter into the automatic chemical supply apparatus and external leakage of residual chemicals or fumes in the process of supplying the chemicals. Except for when a chemical hose and a nitrogen hose are inserted into a chemical hose opening and a nitrogen hose opening which are disposed at the blocking door, the chemical hose opening and the nitrogen hose opening may, when kept open, cause foreign matter to infiltrate into or enter the automatic chemical supply apparatus. Thus, there is a need to provide a separate opening shutter that is able to open and close an opening. However, automatic chemical supply apparatuses that are currently in use do not include a separate opening shutter or, even when they include a separate opening shutter, a worker is not able to easily open and close a chemical hose opening and a nitrogen hose opening simultaneously, and thus there is a problem in that work efficiency of supplying chemicals is degraded.

Korean Patent Registration No. 10-1572537 ("Automatic fastening system between chemical tank lorry and ACQC unit") discloses a chemical hose opening and a nitrogen hose opening but does not disclose a separate opening shutter, and thus, when equipment is not in use, foreign matter may enter the equipment and cause a failure or malfunction.

Also, conversely, chemicals or fumes may leak to the outside due to chemicals leaking or remaining inside the system (equipment).

SUMMARY OF THE INVENTION

The present disclosure is directed to providing an automatic chemical supply apparatus capable of easily opening and closing a chemical hose opening and a nitrogen hose opening and guaranteeing reliable opening and closing thereof to prevent introduction of foreign matter or leakage of chemicals or fumes.

An automatic chemical supply apparatus, in which a male connector is transferred in a forward-backward direction by a transfer unit to fasten the male connector to a female connector in order to connect a chemical tank and a chemical storage tank and supply chemicals from one side to the other side, includes a blocking door which consists of an opening/closing door and a blocking unit that are installed on a frame and which is configured to block an interior of the automatic chemical supply apparatus from the outside in a state in which a hose is seated on a mounting portion, a hose opening which is disposed at the blocking door and through which the hose passes in a state in which the opening/closing door is closed, and an opening shutter unit which is disposed on the blocking door and configured to open and close the hose opening, wherein the opening/closing door rotates or moves with respect to the frame to open or close one side portion of the frame, and the opening shutter unit includes an opening cover unit and an opening/closing manipulation unit configured to manipulate opening and closing of the opening cover unit to guarantee easy and reliable opening and closing thereof.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
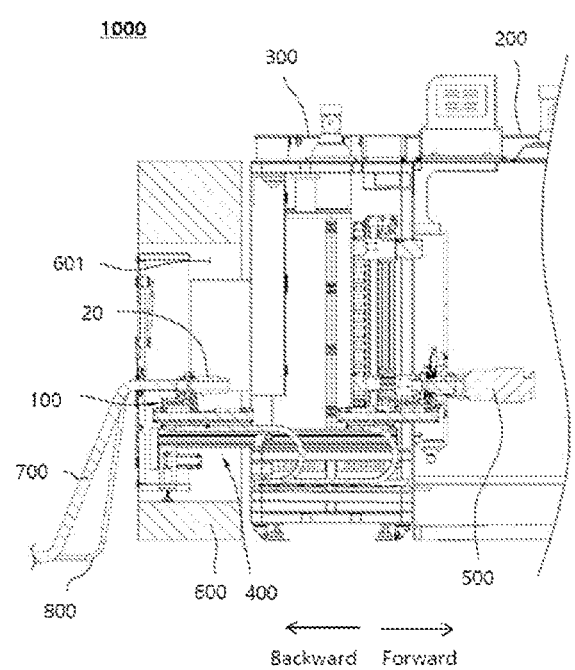
FIG. 1 is a view for describing a side of an automatic chemical supply apparatus according to an embodiment.

Hereinafter, exemplary embodiments of the present disclosure will be described in detail with reference to the accompanying drawings to enable those of ordinary skill in the art to easily understand and practice the present disclosure. In describing the present disclosure, when detailed description of a known related function or configuration is determined as having the possibility of unnecessarily obscuring the gist of the embodiments of the present disclosure, the detailed description thereof will be omitted. The terms used herein are terms defined in consideration of functions in embodiments of the present disclosure and may vary according to an intention or practice of a user or an operator. Therefore, the terms should be defined on the basis of the content throughout the specification.

Also, the above-described aspects of the disclosure and additional aspects thereof will become apparent through embodiments described below. Even when illustrated as a single integrated configuration in the drawings, configurations of aspects or embodiments selectively described herein should be understood as being able to be freely combined with each other unless otherwise stated and unless technical contradiction is clear to those of ordinary skill in the art.

Therefore, embodiments described herein and configurations illustrated in the drawings are merely the most preferred embodiments of the present disclosure and do not represent the entire technical idea of the present disclosure, and thus, it should be understood that various equivalents and modifications, which can replace the most preferred embodiments, may be present at the time of filing this application.

FIG. 1 is a view for describing a side of an automatic chemical supply apparatus according to an embodiment. As illustrated, an automatic chemical supply apparatus 1000 (which is an automatic clean quick coupler unit (ACQC unit)) may include a male connector mounting portion 100, a housing main body 200, a transfer housing 300, a transfer unit 400, and a female connector 500.

In the automatic chemical supply apparatus, in order to connect a chemical tank and a chemical storage tank and supply chemicals from one side to the other side, a male connector 20 may be transferred in a forward-backward direction by the transfer unit 400 to fasten the male connector 20 to the female connector 500.

One side end portion of the transfer unit 400 may be inserted into an opening 601 formed in a wall body 600. The wall body 600 refers to a wall constituting a building, and the opening 601 is formed to allow communication between the outside and inside of the building.

When a worker mounts the male connector 20 on the male connector mounting portion 100, which is connected to a chemical hose 700, and fixes the male connector 20, by operation of the transfer unit 400, the male connector mounting portion 100 is moved forward, and the male connector 20 is inserted into (fastened to) the female connector 500. The transfer unit 400 may consist of one or more stages and drivers and thus may slide the male connector mounting portion 100 back and forth on the stages.

Along with the chemical hose 700, a nitrogen hose 800 may also be connected to the automatic chemical supply apparatus 1000 and may supply nitrogen ($N_2$) to a tank lorry to accelerate and facilitate supplying of chemicals by pressing.

The housing main body 200 may accommodate the female connector 500, and the transfer housing 300 may accommodate the transfer unit 400.

Figure 2:
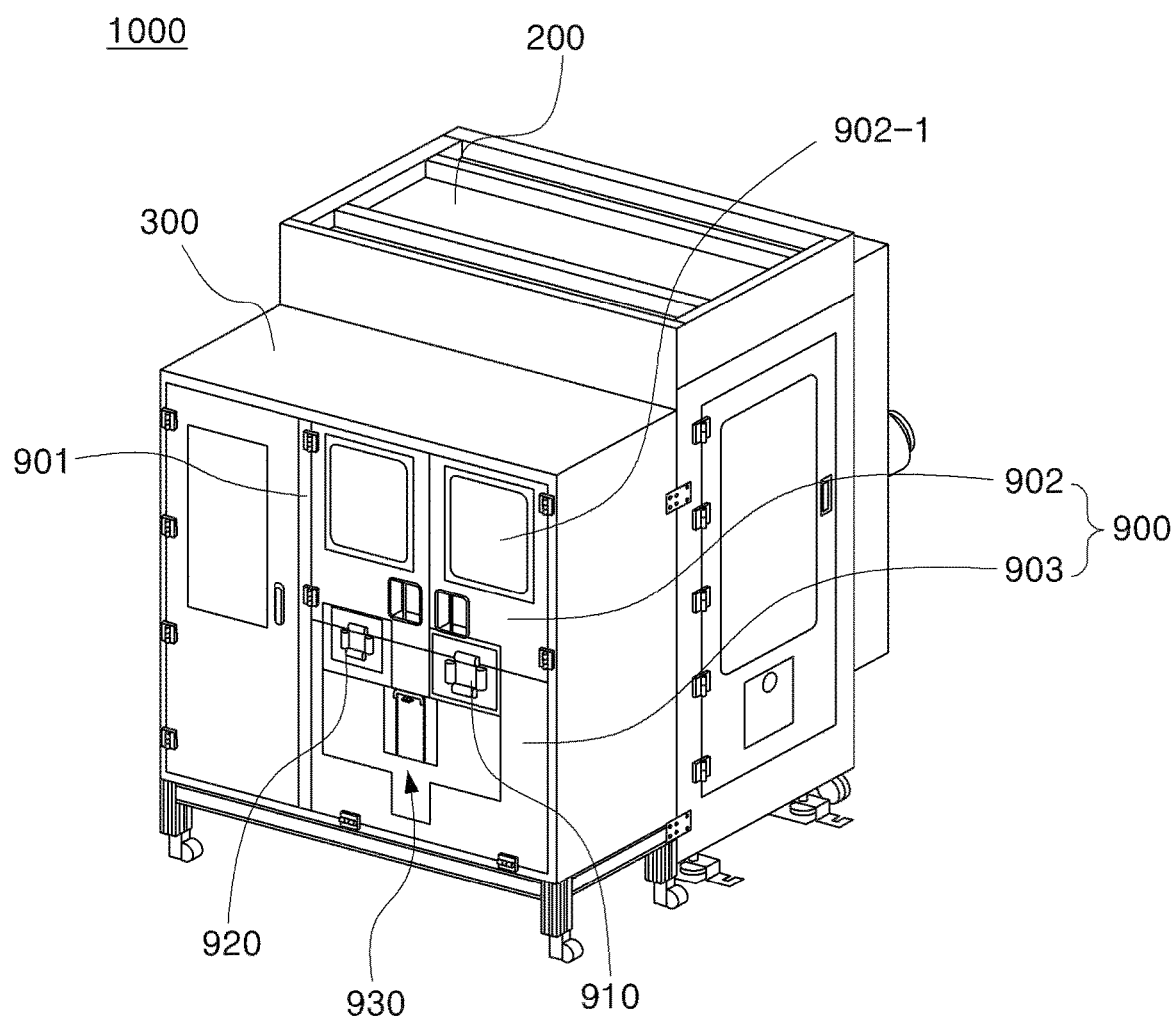
FIG. 2 is a view for describing an exterior of the automatic chemical supply apparatus according to an embodiment.

FIG. 2 is a view for describing an exterior of the automatic chemical supply apparatus according to an embodiment. The automatic chemical supply apparatus, in which a male connector is transferred in the forward-backward direction by a transfer unit to fasten the male connector to a female connector in order to connect a chemical tank and a chemical storage tank and supply chemicals from one side to the other side, may include a blocking door which consists of an opening/closing door 902 and a blocking unit 903 that are installed at a frame 901 and which is configured to block an interior of the automatic chemical supply apparatus from the outside in a state in which a hose is seated on a mounting portion, a hose opening which is disposed at the blocking door and through which the hose passes in a state in which the opening/closing door is closed, and an opening shutter unit 930 which is configured to open and close the hose opening. The opening shutter unit may include an opening cover unit and an opening/closing manipulation unit configured to manipulate opening and closing of the opening cover unit.

According to an embodiment, the hose may include the chemical hose and the nitrogen hose 800, and the hose opening may include a chemical hose opening 910 and a nitrogen hose opening 920.

The automatic chemical supply apparatus 1000 (which is an ACQC unit), in which a male connector is transferred in the forward-backward direction by a transfer unit to fasten the male connector to a female connector in order to connect a chemical tank and a chemical storage tank and supply chemicals from one side to the other side, may include a blocking door 900, the chemical hose opening 910, the nitrogen hose opening 920, and the opening shutter unit 930. The housing main body 200 may accommodate the female connector, and the transfer housing 300 may accommodate the transfer unit. The automatic chemical supply apparatus may include the chemical hose opening 910 but not include the nitrogen hose opening 920.

The blocking door 900 may consist of the opening/closing door 902 and the blocking unit 903 that are installed on the frame 901 and may serve to block an interior of the automatic chemical supply apparatus from the outside in a state in which the chemical hose and the nitrogen hose are seated on mounting portions thereof. The opening/closing door 902 may be disposed at an upper portion of the blocking door 900, and the blocking unit 903 may be disposed at a lower portion of the blocking door 900.

The opening/closing door 902 may rotate or move with respect to the frame 901 to open or close one side portion of the frame. The rotation may be achieved by either a hinge structure or a sliding structure. A see-through window 902-1 is formed on the opening/closing door 902, and thus a worker may check an internal state of the automatic chemical supply apparatus in a state in which the opening/closing door is closed.

The blocking unit 903 may be openable and closable or may not be openable and closable. The blocking door 900 serves to prevent external leakage of chemicals inside the automatic chemical supply apparatus and block introduction of external foreign matter.

Each of the chemical hose opening 910 and the nitrogen hose opening 920 may be disposed at the blocking door, and the chemical hose and the nitrogen hose may pass through the chemical hose opening 910 and the nitrogen hose opening 920 in a state in which the opening/closing door is closed. The chemical hose opening 910 and the nitrogen hose opening 920 may be disposed to be adjacent to each other, and an area of the chemical hose opening 910 may be larger than an area of the nitrogen hose opening 920.

The opening shutter unit 930 may be disposed on the blocking door 900 and may simultaneously open and close the chemical hose opening and the nitrogen hose opening.

Figure 3:
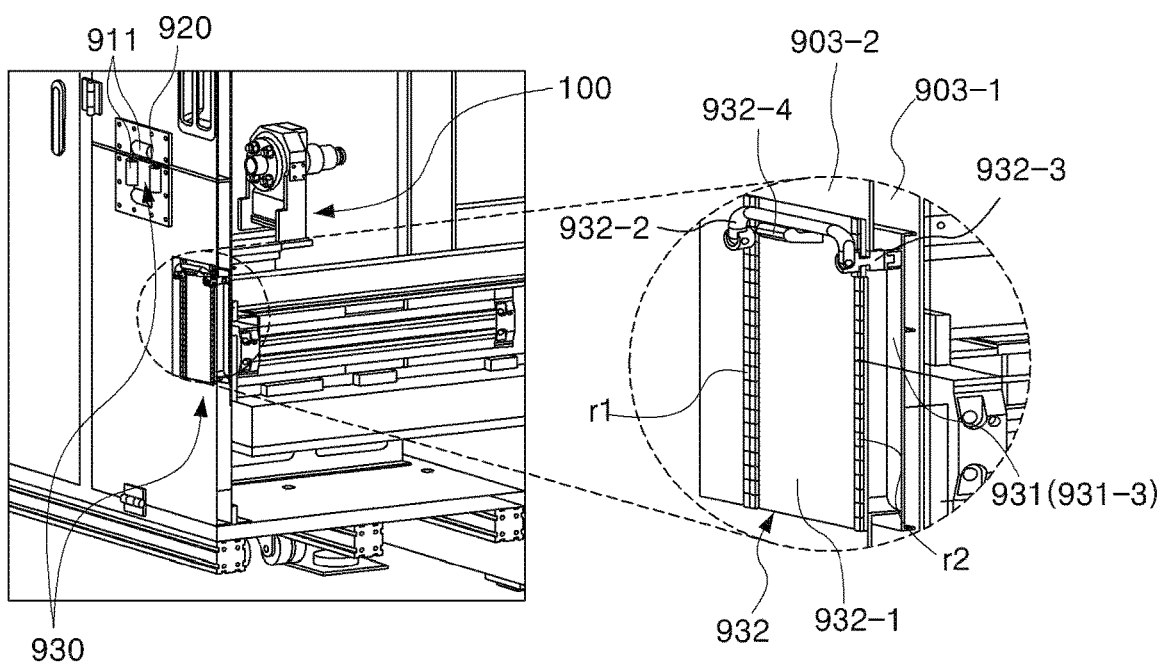
FIG. 3 is a view for describing a portion of a cross-section of the automatic chemical supply apparatus according to an embodiment.
Figure 4:
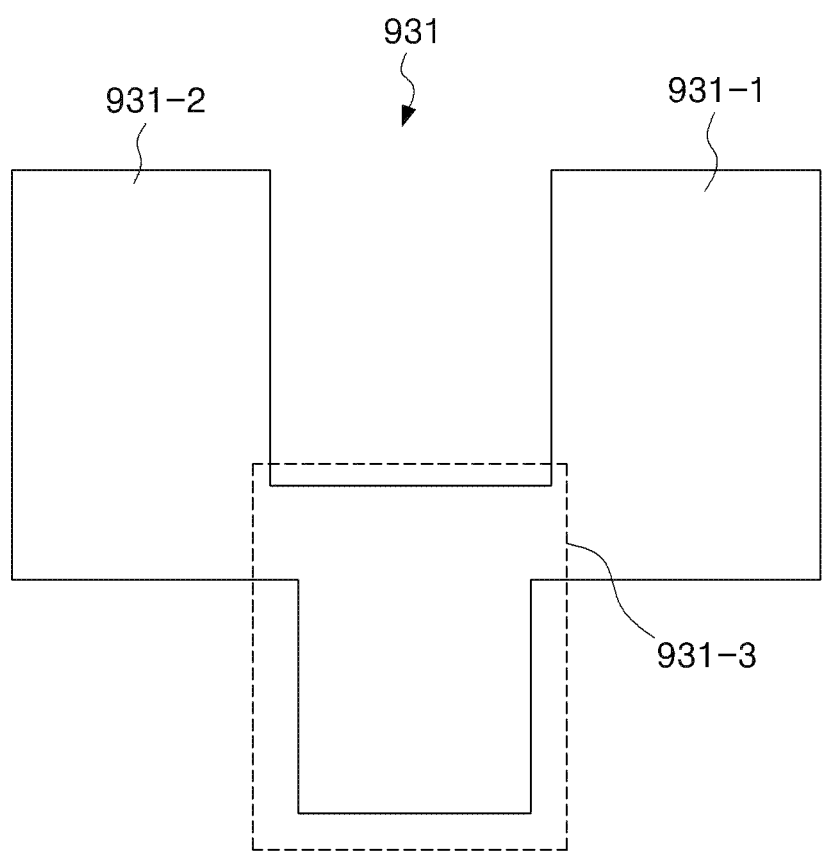
FIG. 4 is a view for describing an opening cover unit.
Figure 5:
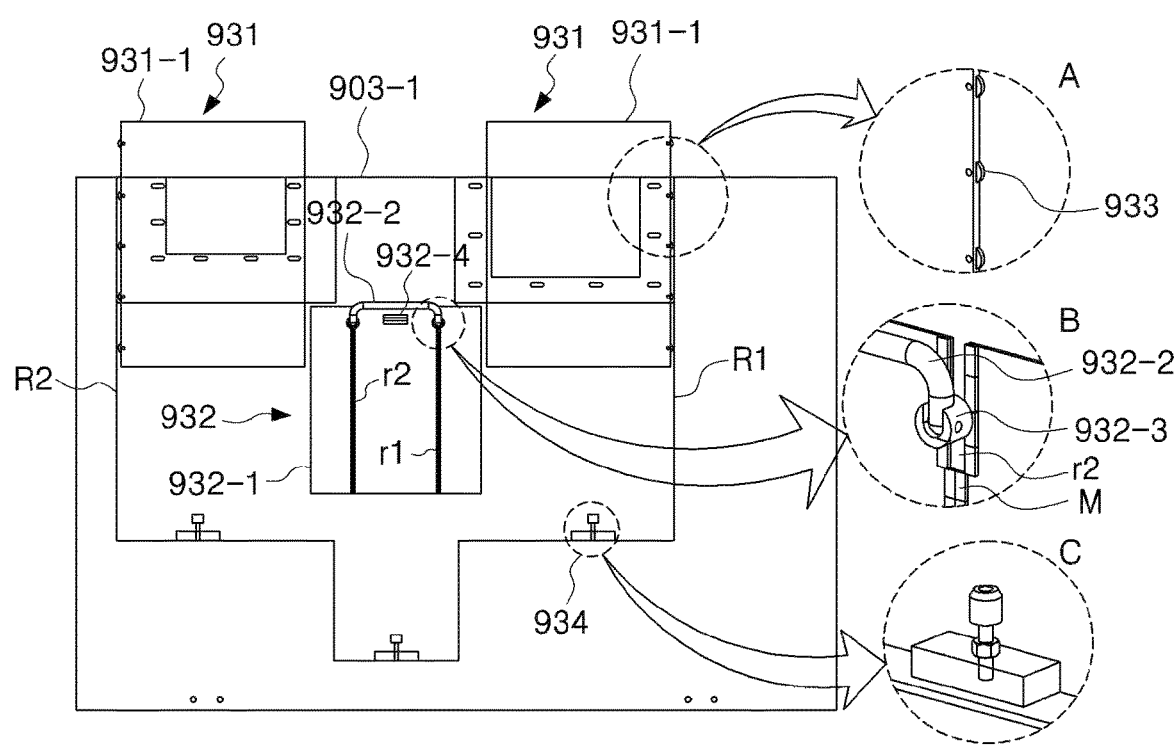
FIG. 5 is a view for describing an opening shutter unit.

FIG. 3 is a view for describing a portion of a cross-section of the automatic chemical supply apparatus according to an embodiment, FIG. 4 is a view for describing an opening cover unit, and FIG. 5 is a view for describing an opening shutter unit. In FIG. 5, A, B, and C are enlarged views of each corresponding portion.

The opening shutter unit 930 may be disposed on the blocking door 900. The opening shutter unit 930 may include an opening cover unit 931 and an opening/closing manipulation unit 932 configured to manipulate opening and closing of the opening cover unit 931.

Rotary rollers 911 may be disposed around the chemical hose opening 910 and the nitrogen hose opening 920 to allow the hoses to smoothly move back and forth.

The opening cover unit 931 may include a chemical opening cover 931-1 configured to move upward or downward along a first cover rail to open or close the chemical hose opening and a nitrogen opening cover 931-2 configured to move upward or downward along a second cover rail to open or close the nitrogen hose opening.

The opening cover unit 931 may further include a cover connecting portion 931-3 in addition to including the chemical opening cover 931-1 and the nitrogen opening cover 931-2. The chemical opening cover 931-1, the nitrogen opening cover 931-2, and the cover connecting portion 931-3 may be integrally formed in the shape of a single plate or may not be integrally formed, but the chemical opening cover 931-1, the nitrogen opening cover 931-2, and the cover connecting portion 931-3 being integrally formed in the shape of a single plate as illustrated in FIG. 4 is preferable. The chemical opening cover 931-1 may slide upward or downward along a first cover rail R1 to open or close the chemical hose opening. The nitrogen opening cover 931-2 may slide upward or downward along a second cover rail R2 to open or close the nitrogen hose opening. FIG. 5 illustrates a state in which the chemical opening cover 931-1 and the nitrogen opening cover 931-2 are closed.

The cover connecting portion 931-3 may be disposed between the chemical opening cover 931-1 and the nitrogen opening cover 931-2 to fix and connect the chemical opening cover and the nitrogen opening cover. The cover connecting portion 931-3 may protrude downward as illustrated in FIG. 4 in order to secure a space for providing (installing) the opening/closing manipulation unit 932. The opening/closing manipulation unit 932 may be disposed at the cover connecting portion 931-3.

As illustrated in FIGS. 3 and 5, the opening/closing manipulation unit 932 may include a manipulation plate 932-1, a handle 932-2, a handle connecting portion 932-3, and a handle holder 932-4.

The manipulation plate 932-1 may be disposed at the blocking unit and have a pair of guide rails r1 and r2 formed thereon.

The handle 932-2 may be disposed on the manipulation plate 932-1, and a worker may slide the handle 932-2 upward or downward along the guide rails.

The handle connecting portion 932-3 may be disposed in each of the guide rails r1 and r2 to fix and connect the handle 932-2 and the cover connecting portion 931-3. The handle 932-2 and the handle connecting portion 932-3 may be hinge-connected so that the handle is rotatable. Therefore, the handle 932-2 may be horizontally pressed against the manipulation plate 932-1 and rotate to vertically protrude from the manipulation plate 932-1.

The opening/closing manipulation unit 932 may further include the handle holder 932-4. The handle holder 932-4 may be disposed at an upper portion of the manipulation plate 932-1 and may have the handle 932-2 seated thereon to support the handle 932-2. Therefore, when a worker lifts the handle 932-2 and places the handle 932-2 on the handle holder 932-4, downward movement of the handle 932-2 may be prevented, and thus, a state in which the opening cover unit 931 closes the chemical opening cover 931-1 and the nitrogen opening cover 931-2 may be continuously maintained.

Also, when the worker separates the handle 932-2 from the handle holder 932-4, due to the gravity, the handle 932-2 and the opening cover unit 931 may move downward, and thus, a state in which the opening cover unit 931 opens the chemical opening cover 931-1 and the nitrogen opening cover 931-2 may be continuously maintained.

According to an embodiment, the blocking unit 903 may include an inner blocking unit 903-1 and an outer blocking unit 903-2 as illustrated in FIG. 3, and the cover connecting portion 931-3 may be disposed between the inner blocking unit 903-1 and an outer blocking unit 903-2. Thus, it is advantageous for supporting and guiding the cover connecting portion 931-3, and external exposure of the cover connecting portion may be avoided. A space in which the opening cover unit 931 may be accommodated may be provided in the inner blocking unit 903-1.

According to an embodiment, as illustrated in FIG. 5, guide rollers 933 may be further provided on side surfaces of the chemical opening cover 931-1 and the nitrogen opening cover 931-2 that come into contact with the first cover rail R1 and the second cover rail R2, respectively. Thus, the chemical opening cover 931-1 and the nitrogen opening cover 931-2 may smoothly slide along the cover rails R1 and R2. The cover rails R1 and R2 may be disposed at the inner blocking unit 903-1.

According to an embodiment, in the inner blocking unit 903-1, a buffering member 934 may be further provided below the chemical opening cover 931-1 and the nitrogen opening cover 931-2. A spring, a cylinder, or a shock absorber may be configured as the buffering member 934. Thus, an impact due to rapid downward movement of the chemical opening cover 931-1 and the nitrogen opening cover 931-2 may be reduced, and damage thereto may be prevented.

According to an embodiment, a plurality of permanent magnets may be further provided on the guide rails r1 and r2, and permanent magnets of different polarities (S-pole, N-pole) may be disposed to face each other to form a constant attractive force (B of FIG. 5). Thus, due to an increase in friction between the handle connecting portion 932-3 and the guide rails r1 and r2 and the permanent magnets performing a buffering function, rapid downward movement of the chemical opening cover 931-1 and the nitrogen opening cover 931-2 may be prevented. Also, at places where the handle connecting portion has passed, the permanent magnets may stick to each other and seal a gap.

According to an embodiment, the automatic chemical supply apparatus may also automatically open or close the chemical hose opening 910 and the nitrogen hose opening 920 by sliding the opening cover unit 931 upward or downward using a driver such as a cylinder or a motor without using the handle, the handle connecting portion, or the handle holder.

Figure 6:
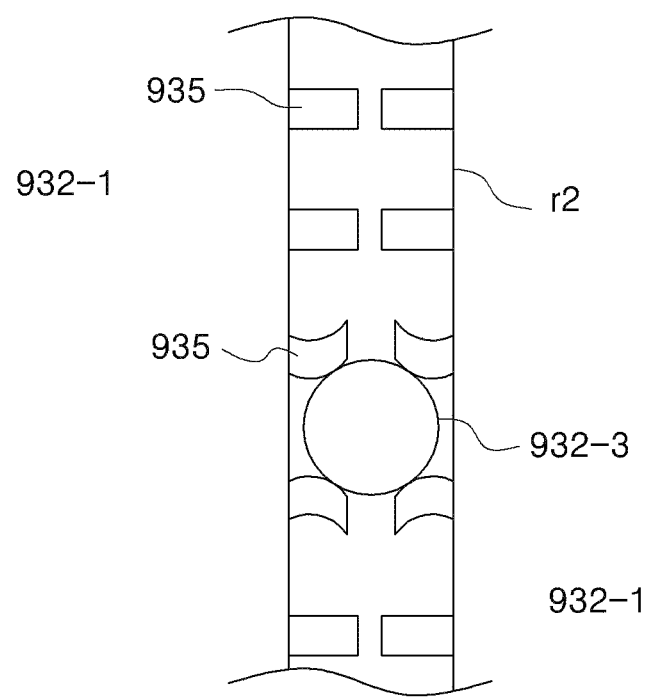
FIG. 6 is a view for describing the automatic chemical supply apparatus in which an elastic member is disposed on a guide rail.

FIG. 6 is a view for describing the automatic chemical supply apparatus in which an elastic member is disposed on a guide rail. According to an embodiment, a plurality of elastic members 935 may be further provided on the guide rails r1 and r2, and the elastic members may be disposed to face each other. Thus, due to an increase in friction between the handle connecting portion 932-3 and the guide rails r1 and r2 and the elastic members performing a buffering function, rapid downward movement of the chemical opening cover 931-1 and the nitrogen opening cover 931-2 may be prevented. Also, at places where the handle connecting portion has passed, the elastic members may stick to each other and seal a gap. Various other methods may be used to achieve the same effect.

Figure 7:
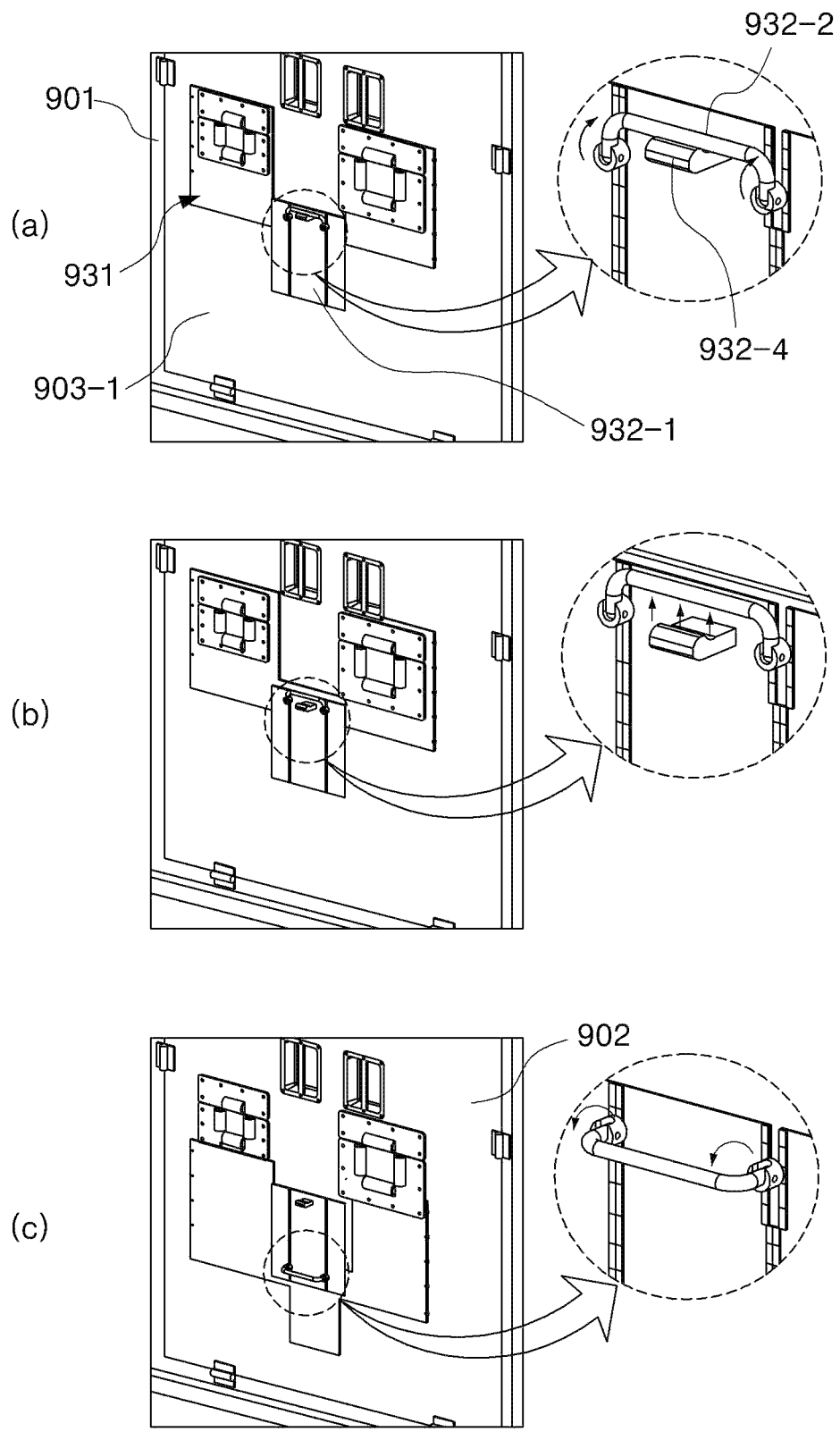
FIG. 7 is a view for describing a process in which a chemical hose opening and a nitrogen hose opening are opened and closed by manipulation of an opening/closing manipulation unit.

FIG. 7 is a view for describing a process in which a chemical hose opening and a nitrogen hose opening are opened and closed by manipulation of an opening/closing manipulation unit. As illustrated in FIG. 7(a), the handle 932-2 is lifted by the worker, and the handle is rotated in the direction indicated by the arrow and is seated on the handle holder 932-4 so that the opening cover unit 931 closes the chemical hose opening and the nitrogen hose opening, and the state in which the chemical hose opening and the nitrogen hose opening are closed is continuously maintained. Thus, external foreign matter is prevented from entering the automatic chemical supply apparatus through the chemical hose opening or the nitrogen hose opening.

For use of the automatic chemical supply apparatus, the handle 932-2 is further lifted by the worker in the direction indicated by the arrows as illustrated in FIG. 7(b). Then, as illustrated in FIG. 7(c), the handle 932-2 is rotated in the direction indicated by the arrow and is pressed downward so that the opening cover unit 931 opens the chemical hose opening and the nitrogen hose opening, and the state in which the chemical hose opening and the nitrogen hose opening are opened is continuously maintained. Thus, in a state in which the chemical hose and the nitrogen hose pass through the chemical hose opening and the nitrogen hose opening, respectively, and the opening/closing door 902 is closed, the chemical hose and the nitrogen hose may be moved in the forward-backward direction, and the male connector may be fastened to or separated from the female connector.

According to the present disclosure, when an automatic chemical supply apparatus is not in use, by blocking a hose opening, it is possible to block introduction of foreign matter from the outside to the inside of the automatic chemical supply apparatus or external leakage of chemicals or fumes. In this way, malfunctioning can be prevented, and safety of workers can be promoted.

Also, since a worker is able to easily open or close a chemical hose opening and a nitrogen hose opening by one operation, work efficiency and productivity of supplying chemicals can be improved.

What is claimed is:

1. An automatic chemical supply apparatus in which a male connector is transferred in a forward-backward direction by a transfer unit to fasten the male connector to a female connector in order to connect a chemical tank and a chemical storage tank and supply chemicals from one side to the other side, the automatic chemical supply apparatus comprising:
   a blocking door which consists of an opening/closing door and a blocking unit that are installed at a frame and which is configured to block an interior of the automatic chemical supply apparatus from the outside in a state in which a hose is seated on a mounting portion;
   a hose opening which is disposed at the blocking door and through which the hose passes in a state in which the opening/closing door is closed; and
   an opening shutter unit which is disposed on the blocking door and configured to open and close the hose opening,
   wherein the opening/closing door rotates or moves with respect to the frame to open or close one side portion of the frame, and
   the opening shutter unit includes an opening cover unit and an opening/closing manipulation unit configured to manipulate opening and closing of the opening cover unit.

2. The automatic chemical supply apparatus of claim 1, wherein:
   the hose includes a chemical hose and a nitrogen hose;
   the hose opening includes a chemical hose opening and a nitrogen hose opening; and
   the opening cover unit includes a chemical opening cover configured to move upward or downward along a first cover rail to open or close the chemical hose opening and a nitrogen opening cover configured to move upward or downward along a second cover rail to open or close the nitrogen hose opening.

3. The automatic chemical supply apparatus of claim 2, wherein the opening cover unit further includes a cover connecting portion which is disposed between the chemical opening cover and the nitrogen opening cover to fix and connect the chemical opening cover and the nitrogen opening cover.

4. The automatic chemical supply apparatus of claim 3, wherein the opening/closing manipulation unit is disposed at the cover connecting portion.

5. The automatic chemical supply apparatus of claim 3, wherein:
   the blocking unit includes an inner blocking unit and an outer blocking unit; and
   the cover connecting portion is disposed between the inner blocking unit and the outer blocking unit.

6. The automatic chemical supply apparatus of claim 2, wherein guide rollers are further provided on side surfaces of the chemical opening cover and the nitrogen opening cover that come into contact with the first cover rail and the second cover rail, respectively.

7. The automatic chemical supply apparatus of claim 1, wherein the opening/closing manipulation unit includes:
   a manipulation plate which is disposed at the blocking unit and has a pair of guide rails formed thereon;
   a handle which is disposed on the manipulation plate and is able to be slid upward or downward along the guide rails by a worker; and
   a handle connecting portion which is disposed in each of the guide rails to fix and connect the handle and the cover connecting portion.

8. The automatic chemical supply apparatus of claim 7, wherein the opening/closing manipulation unit further includes a handle holder which is disposed at an upper portion of the manipulation plate and has the handle seated thereon to support the handle.

9. The automatic chemical supply apparatus of claim 7, wherein the handle and the handle connecting portion are hinge-connected so that the handle is rotatable.

10. The automatic chemical supply apparatus of claim 7, wherein a plurality of permanent magnets are further provided on the guide rails, and permanent magnets of different polarities are disposed to face each other to form a constant attractive force.

11. The automatic chemical supply apparatus of claim 7, wherein a plurality of elastic buffering members are further provided on the guide rails, and the elastic buffering members are disposed to face each other.

* * * * *